Sept. 20, 1960 A. J. COBHAM ET AL 2,953,332
APPARATUS FOR TOWING AND REFUELLING AIRCRAFT IN FLIGHT
Original Filed March 31, 1950 9 Sheets-Sheet 1

Sept. 20, 1960 A. J. COBHAM ET AL 2,953,332
APPARATUS FOR TOWING AND REFUELLING AIRCRAFT IN FLIGHT
Original Filed March 31, 1950 9 Sheets-Sheet 3

INVENTORS
A. J. Cobham, C. H. Latimer-Needham,
C. H. Smith and P. L. Macgregor
BY
Watson, Cole, Grindle & Watson
ATTORNEYS

FIG. 11.

Sept. 20, 1960        A. J. COBHAM ET AL        2,953,332
APPARATUS FOR TOWING AND REFUELLING AIRCRAFT IN FLIGHT
Original Filed March 31, 1950                    9 Sheets-Sheet 9

INVENTORS
A. J. Cobham, C. H. Latimer-Needham
C. H. Smith and P. S. Macgregor
BY
Watson, Cole, Grindle & Watson
ATTORNEYS

United States Patent Office 2,953,332
Patented Sept. 20, 1960

2,953,332
APPARATUS FOR TOWING AND REFUELLING AIRCRAFT IN FLIGHT

Alan John Cobham and Cecil Hugh Latimer-Needham, Bournemouth, Broadstone, England, Charles Harry Smith, Westport, Conn., and Peter S. Macgregor, Upton, Poole, England, assignors to Flight Refuelling Limited, London, England, a British company Original application March 31, 1950, Ser. No. 153,198, now Patent No. 2,692,102, dated Oct. 19, 1954. Divided and this application Nov. 9, 1953, Ser. No. 390,951

Claims priority, application Great Britain Apr. 1, 1949

6 Claims. (Cl. 244—135)

This invention relates to the refueling of aircraft in flight, including transference of liquids other than fuel, and to the picking-up and casting off of a tow between two aircraft in flight.

This application for United States patent is divided from our co-pending application for United States patent Serial No. 153,198, filed March 31, 1950, now U.S. Patent 2,692,102 to which reference is made and which describes a method and apparatus for coupling and uncoupling two aircraft in flight for refuelling or towing purposes, in which a forwardly facing coupling element mounted substantially rigidly on a "following" aircraft is "flown" into engagement with a complementary, rearwardly facing coupling element mounted on the extremity of an effectively flexible element extended rearwardly from a "leading" aircraft, the coupling elements being of the plug and socket type and provided with resilient latching means for latching the elements together when the plug part of the coupling is forcibly thrust into the socket part and adapted to yield and allow the parts to be forcibly separated by pulling apart with a super-critical tension.

The primary object of the invention is to provide operative interconnection between the means provided for extending and retracting the rearwardly extended element and the actuating means of the master cock, the preferred arrangement being such that such cock is closed when the rearwardly extended tubular element is fully extended, but opens when a slight retraction of such element has been effected, as will occur in response to pressure from astern applied by the following aircraft through the coupling when the parts thereof have been mutually engaged, the extending and retracting means of said element being arranged to apply a continuous slight tension thereto to take up slack when such pressure as above-mentioned is applied, it being understood that such tension is insufficient by itself to overcome the drag of the rearwardly extending element, which may be supplemented by a drogue or like device.

How this object and others as may hereinafter appear are achieved will be more fully understood from the following description having reference to the accompanying drawings illustrating, by way of example only, the general principles and methods of the invention and specific embodiments and modifications thereof, the scope of the invention being defined in the appended claims. In the drawings.

In describing the drawings the usual convention of applying the same reference numeral to like parts in different forms of construction will be followed, distinctive indexes being added where necessary to distinguish between modified forms of the same basic part.

Figures 1, 2:
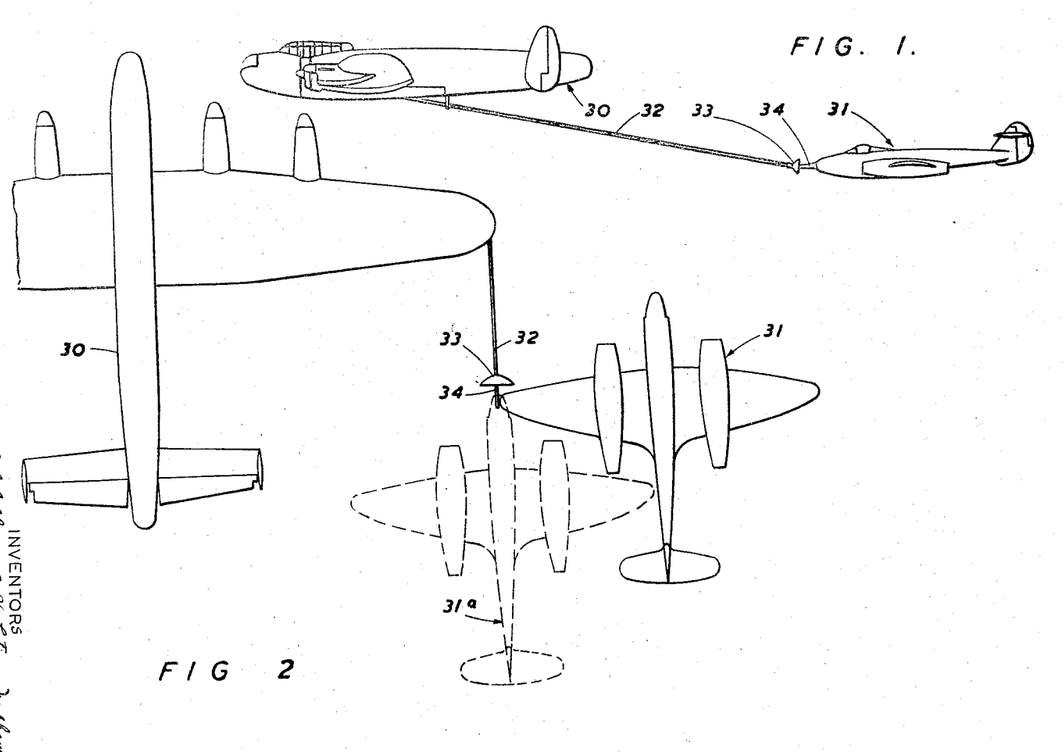
Figure 1 is a schematic view in side elevation illustrating an aircraft being refuelled or/and towed by another aircraft using one form of the apparatus.
Figure 2 is a schematic plan view illustrating the same method and apparatus as in Figure 1, but showing alternative locations of the connecting elements on the two aircraft.

In Figure 1 a leading aircraft 30 is connected for refuelling or/and towing to a following aircraft 31 by means of a hose or hawser 32 trailed by the aircraft 30 and a rigid element or probe 34 extending forwardly from the nose of the following aircraft 31, the element 32 being caused to trail nearly horizontally by means of a drogue 33 mounted on its extremity. The hose or hawser 32 terminates in a socket (see Figures 8 and 9) provided with spring latches which engage a nozzle or spigot (see Figures 8 and 9) on the end of the probe 34. To establish connection the leading aircraft trails the element 32 and the following aircraft approaches from the rear so as to thrust the probe 34 into the socket on the end of the trailing element 32. The drogue 33 is of hollow conical form and constitutes a continuation of the mouth of the socket (see Figures 8 and 9) and thus serves to guide the nozzle or spigot end of the probe into the socket. On entering the socket the nozzle or spigot of the probe is engaged by latches and retained. The operation of the latch mechanism and the manner in which disengagement is effected is hereinafter described in connection with the structure of the socket and probe more particularly with reference to Figures 8 and 9.

In Figure 1 the element 32 is trailed from the underneath of the body of the aircraft 30 and the probe 34 is mounted on the nose of the aircraft 31.

Figure 2 shows an alternative position for the element 32 which, in this instance, is trailed from a wing tip of the aircraft 30, the probe 34 being likewise mounted on a wing tip of the aircraft 31 (shown in full lines). The chain dotted outline 31a indicates the position of the following aircraft when the probe 34 is mounted on the nose thereof, the element 32 being trailed from the wing tip of the leading aircraft.

Figure 3:
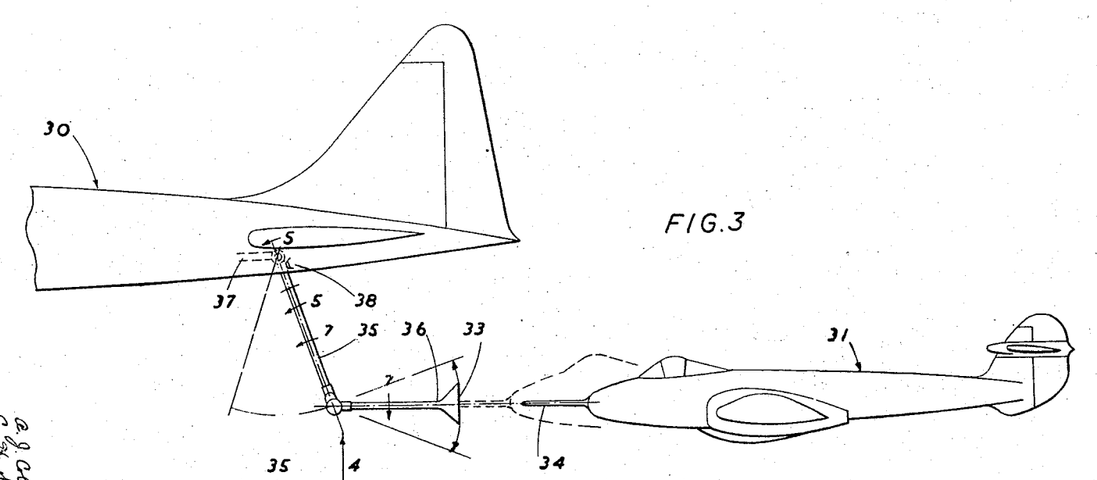
Figure 3 is a view similar to Figure 1 on an enlarged scale showing a modified form of apparatus.
Figure 4:
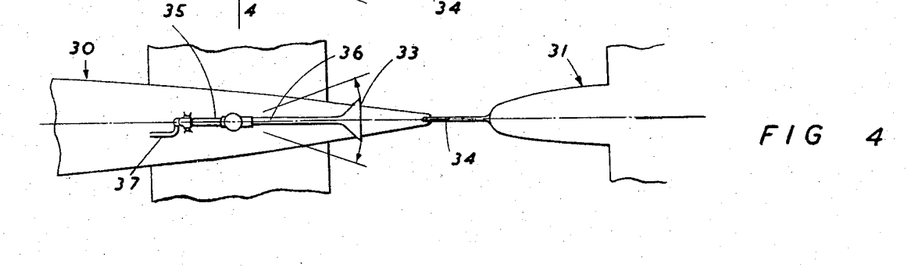
Figure 4 is a schematic underneath plan view in the direction of arrow 4 of Figure 3.

Figures 3 and 4 illustrate an alternative form of construction of the element trailed by the leading aircraft 30. In this instance the trailing element comprises two sections of rigid rod or pipe 35 and 36, the inboard section 35 being suspended from the aircraft 30 on a joint permitting it to swing in a fore and aft direction, its rearward swing being limited to a position slightly beyond the vertical by means of a stop 38. The outboard section 36, which carries the drogue 33 and socket (not shown) at its extremity is connected to the inboard section 35 by means of a joint allowing it to swing vertically when extended in a trailing position by the drogue 33 and the jointed structure and hinged suspension enable the trailing element 35, 36 to be completely retracted within the fuselage of the aircraft 30 if the latter is deep enough. The outboard section 36 is also enabled to swing laterally, as shown in Figure 4, by means of a swivel joint near the inboard end of the section 35 (see Figures 5 and 6).

In Figures 3 and 4 the following aircraft 31 is shown in the approach position before the probe 34 enters the drogue 33 and socket on the outboard portion 36 of the trailing element, the position when contact has been established being indicated in chain dotted lines in Figure 3.

Figure 5:
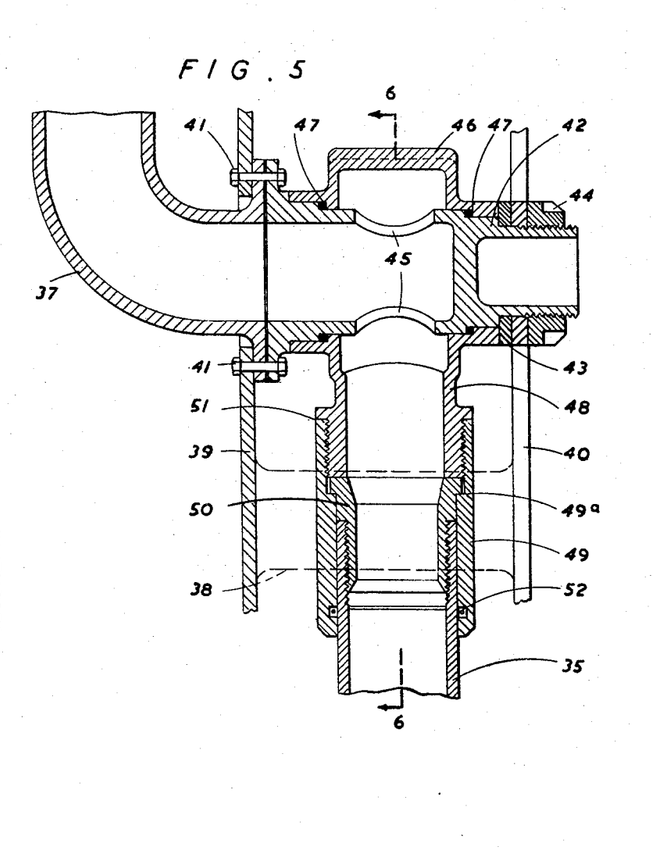
Figure 5 is a sectional view on an enlarged scale on the line 5—5 of Figure 3 illustrating details.
Figure 6:
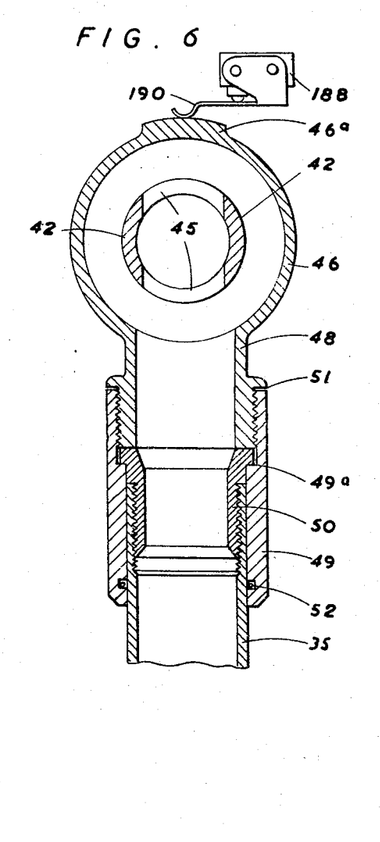
Figure 6 is another detail sectional view on an enlarged scale on the line 6—6 of Figure 5.

Figures 5 and 6 illustrate details of a suspension and swivelling joint structure for inboard element 35 adapted to serve as a refuelling pipe, which is connected through the joint structure to a fixed pipe 37 in the aircraft 31 (see also Figures 3 and 4).

The structure supporting the suspension joint comprises a pair of parallel plates 39, 40 interconnected by a web which constitutes the stop 38 previously referred to. The fixed pipe 37 is secured to the plate 39 and carries a blind-ended extension 42 supported by the plate 40. The extension 42 has openings 45 communicating with the interior of a banjo 46 rotatably supported on the member 42. The hollow neck 48 of the banjo 46 is connected by means of a swivel-joint assembly 49, 50 with the inboard section 35 of the hollow trailing element.

Figure 7:
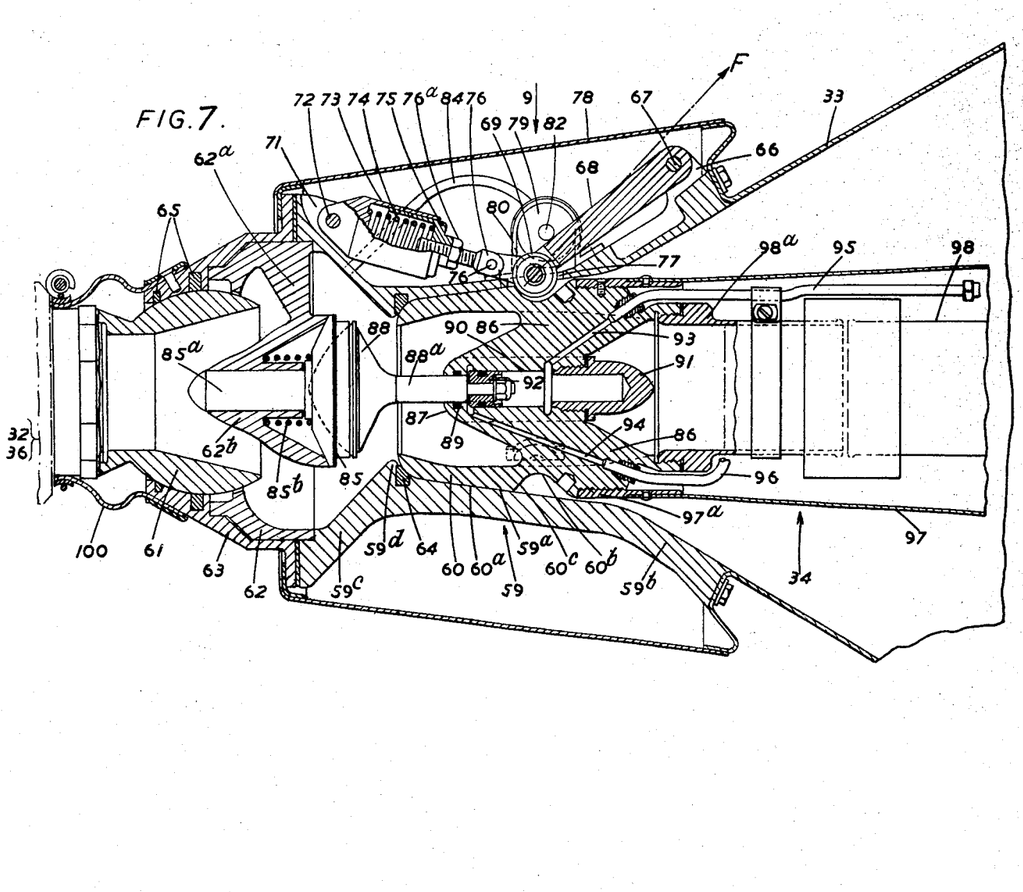
Figure 7 is a view on an enlarged scale, in axial section partly in elevation, of a preferred form of refuelling coupling between the element trailed by the leading aircraft and the rigid element extended from the following aircraft of Figures 1 to 4.

A preferred construction of the coupling means by which a refuelling connection is made between a hollow probe 34 and a trailing hose 32 or pipe element 36 (see Figures 1 and 4) is illustrated in Figure 7.

This coupling means, which in itself does not constitute part of the present invention, is fully described in our co-pending application for United States patent Serial No. 153,198, now U.S. Patent 2,692,102 of which this application for United States patent is a divisional application and to which reference is made. It will therefore be sufficient to summarise the main features of the coupling means illustrated in Figure 7.

The hose 32 or pipe element 36 is connected by means of a ball joint with a socket assembly 59, 62, 63, of which the socket member 59 comprises a tapered throat 59a, a flared mouth 59b, of which the drogue 33, shaped as a rearward facing hollow cone, forms a unitary continuation and an inwardly expanding portion 59c separated from the throat by a constriction 59d.

The socket assembly further comprises a spider member 62 which has integral radial webs 62a supporting an integral central boss 62b axially bored to provide a sliding bearing for the stem 85a of a mushroom valve 85, which is loaded by a spring 85b to move outwardly and seat on the inner face of the constriction 59d of the socket member 59 to close the end of the hose 32 or pipe 35, 36.

On the mouth end of the socket member 59 are three external forked lugs 66, carrying pivot pins 67, pivotally supporting latch levers 68 carrying rollers 69. On the opposite end of the socket member 59 are three forked lugs 71 carrying pivot pins 72 pivotally supporting spring-plunger assemblies 73—76 which load the latch-levers to move inwards and cause the rollers 69 to project into the interior of the throat 59a of the socket through slots 77, as will be evident from the drawing (Figure 7).

The probe 34 extending forwardly from the following aircraft comprises a tube 98, which serves as the fuel pipe, connected to a nozzle 60 secured to the outboard end of a sheet metal outer probe tube 97.

The nozzle 60 comprises a tapered extremity 60a, shaped to fit into the throat 59a of the socket member 59 and engage with its tip the sealing ring 64, and a circumferential groove 60b, in which the latch rollers 69 are resiliently engageable by the spring-plunger assemblies 73—76.

The nozzle 60 has integral radial webs 86 supporting an integral central boss 87, which is axially bored to provide a sliding bearing for the stem 88a of a mushroom valve 88 seating on the mouth of the nozzle and movable outwardly to leave its seating by a double-acting hydraulic jack, whose piston 92 is secured to the valve stem 88a.

With the nozzle inserted in the socket, as shown in Figure 7, when valve 88 is moved outwards by the hydraulic ram 90, 92 to leave its seating it engages the socket valve 85 and moves it inwardly off its seating to place the hose 32 or pipe 35, 36 in fuel-transmitting communication with the interior of the inner probe-tube 98. If the nozzle should be pulled out of the socket before the probe valve 88 is brought back onto its seating to close the probe, the valve 85 will be automatically closed by the spring 85b.

Figure 8:
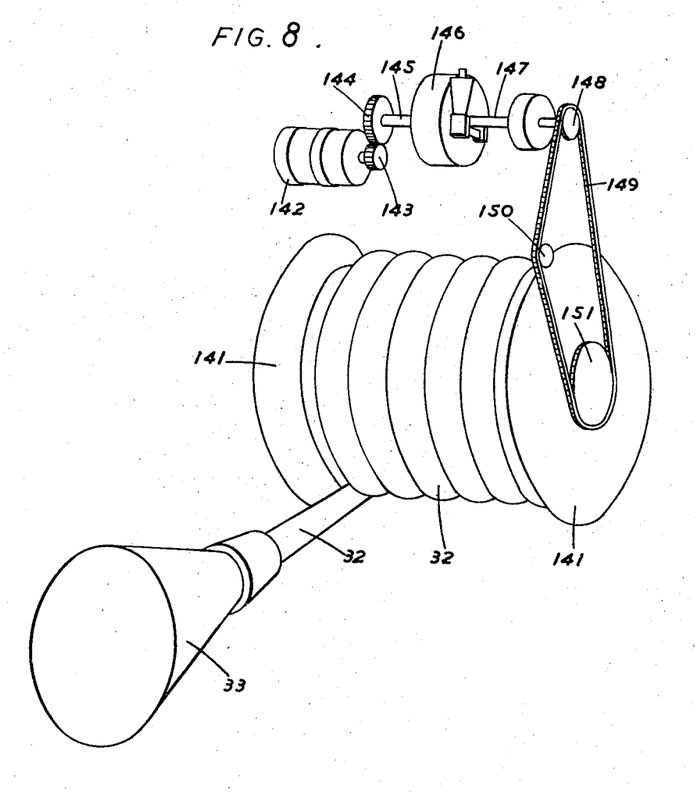
Figure 8 is a schematic perspective view of the winding gear of a trailing hose or hawser as fitted in the leading aircraft of Figure 1.

The winding gear of a hose or hawser 32 trailed by a leading aircraft is schematically illustrated in Figure 8. The element 32, hereinafter referred to for brevity as a hose, carrying the drogue 33 at its end, is wound on a reel 141 which is driven in the direction for winding in the hose by a motor 142 through a gear pair 143, 144, a shaft 145, a fluid coupling 146, a second shaft 147, a sprocket 148, and an endless chain 149, which passes over a jockey sprocket 150 and a sprocket 151 on the reel 141.

By running the motor at reduced speed, while the hose is being unreeled by the drag of the drogue and when the hose is fully extended, a continuous torque is applied to the reel tending to wind in the hose. As long as the drag of the drogue 133 applies a tension to the hose superior to that applied by the winding-in torque transmitted by the fluid coupling the hose will remain extended, but if the drag of the drogue is relieved by forward pressure exerted by the probe the torque applied through the fluid coupling will wind in the hose sufficiently to take up slack in it.

Figure 9:
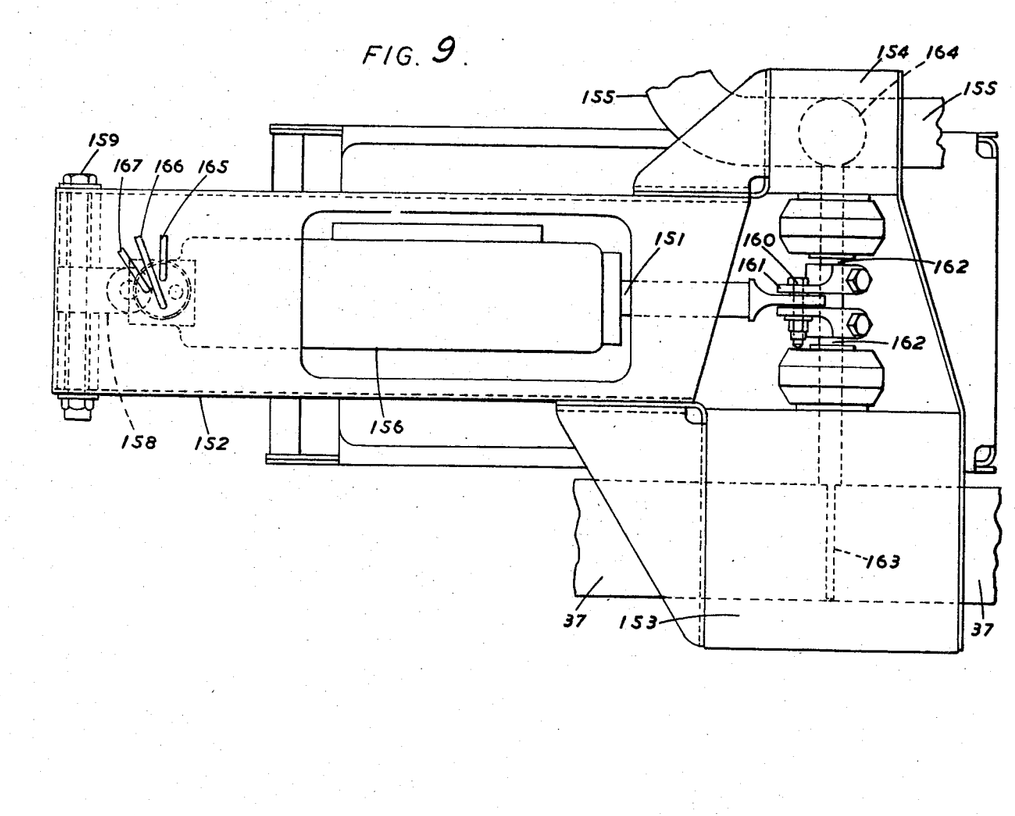
Figure 9 is a plan view of a fuel and vent cock assembly forming part of the refuelling equipment of a tanker aircraft.

In Figures 4 to 6 the inboard end of the jointed trailing pipe 35, 36 is shown as connected to a fixed pipe 37 in the aircraft 30. Similarly the inboard end of the trailing hose or pipe 32 of Figures 1, 2, 7 and 8 will be connected to a fixed pipe 37 (Figure 9). This pipe will normally be provided with a fuel cock for controlling the flow through the pipe and with an atmospheric vent controlled by a vent cock for venting the pipe when the fuel cock is closed.

Figure 9 illustrates a preferred arrangement in which both the fuel cock and vent cock are operated by an electromagnetic actuator so that when one is opened the other is closed and conversely. The cock and actuator assembly is mounted on a frame 152 which supports a fuel cock 153 in the run of pipe 37 and a vent cock 54 in the run of a pipe 155, one end of which is connected to the pipe 37 and the other is vented to atmosphere. The frame 152 also supports an electromagnetic actuator, of which the stationary part 156 is anchored to the frame by means of a shackle and shackle pin 159, and the moving part 151 is connected by means of a pin 160 with a forked lever 161 clamped to a shaft 162 common to both cocks. Both cocks are standardized components, their operative elements being here schematically represented by butterflies 163, 164, both mounted on the shaft 162 and so disposed thereon that when the fuel cock 153 is closed the vent cock 154 is in the fully open position and conversely. The vent cock is for the purpose of preventing a hydraulic lock in the hose line when the hose is extended or drawn out with the fuel cock in closed position, as might otherwise occur when the receiving aircraft is dropping back relative to the refueling aircraft or is intentionally breaking away to release the coupling between the two hoses. Where the vent cock is open at this time it will be seen that this will permit such breaking away at the head pressure between the two aircraft. The actuator 156, 157 is of a double-acting type (the ends of its winding not shown), being respectively connected to input leads 165, 166 and a central tapping from the winding being connected to a common return lead 167.

Figure 10:
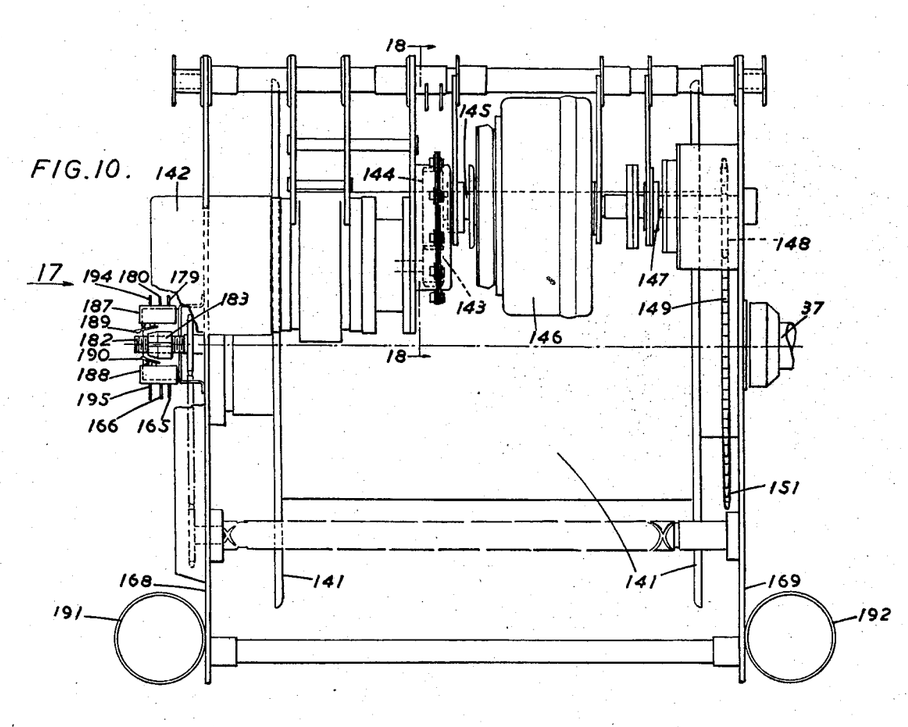
Figure 10 is a rear elevation partly in section of winding gear for a trailed hose element.
Figure 11:
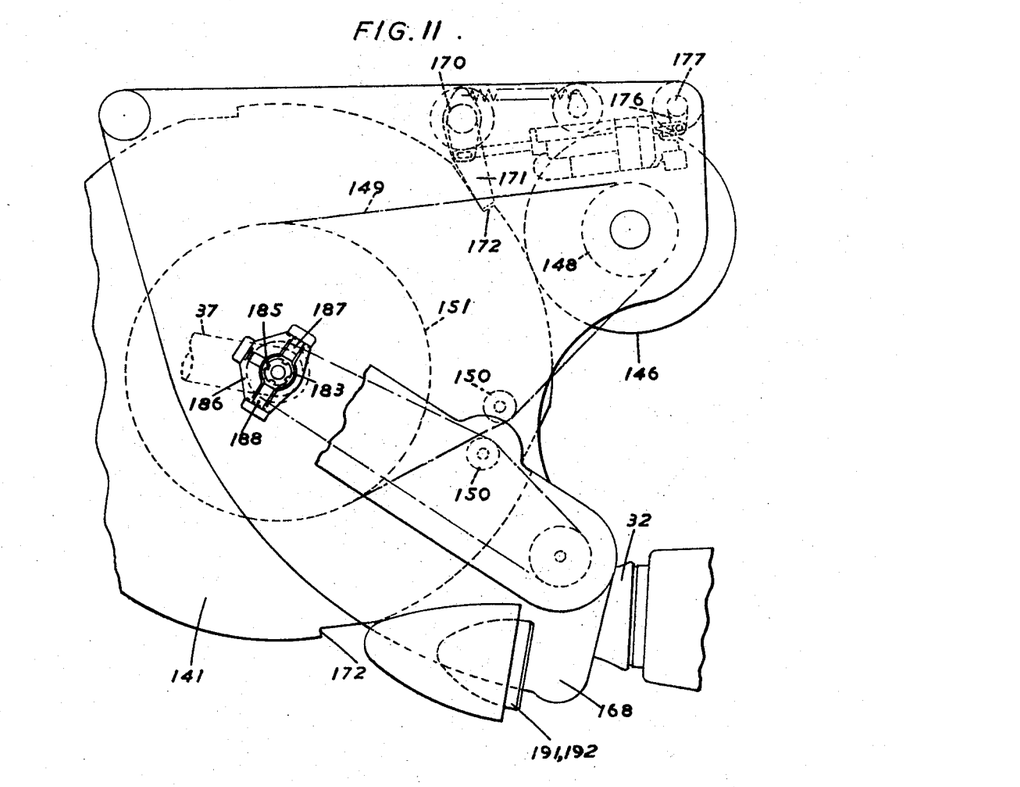
Figure 11 is an end elevation of the winding gear viewed in the direction of arrows 17 of Figure 10.
Figure 12:
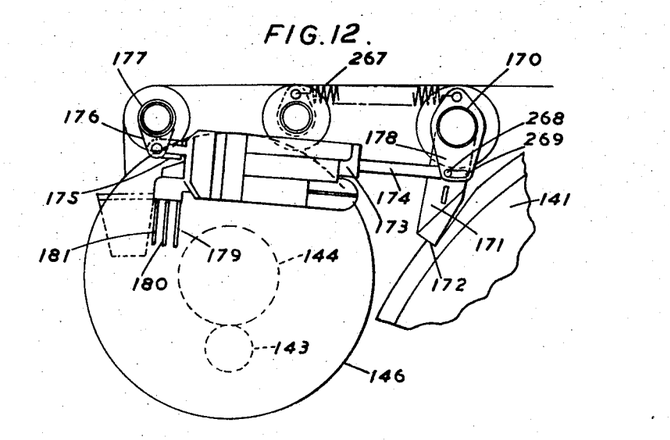
Figure 12 shows a detail of the winding gear in section on the line 18—18 of Figure 10.

A preferred form of construction of the winding gear schematically illustrated in Figure 8 is illustrated in greater detail in Figures 10 to 12. The winding gear is supported on a structure comprising side frame plates 168, 169 and comprises, in addition to the components 141–151 previously mentioned with reference to Figure 8, a transverse rocking bar 170 carrying stop pawls 171 engageable with ratchet teeth 172 in the rims of the reel 141, and a stop pawl actuator in the form of a double-acting electromagnetic ram 173, 174, of which the stationary part 173 is anchored by means of a shackle 175 to a bracket 176 on a transverse bar 177 of the frame, and the moving part 174 is connected to a lever 178 on the rocking bar 170. The actuator is of the same kind as the fuel and vent cock actuator illustrated in Figure 9, its electrical connections comprising input leads 179, 180 and a return lead 181. The lever 178 is loaded by a tension spring 267 in the direction for engaging the stop pawls 171 and it is connected to the moving part 174 of the actuator by means of a pin 268 and slot 269 enabling the pawls 171 to ratchet over the teeth 172 when the reel 141 is paying out the hose.

One end of the axle of the reel carries a lead screw 182 on which is threaded a nut 183 which is free to move axially and is longitudinally slotted at 184 for engagement by a spring-loaded plunger 185, and is thereby prevented from rotating. The spring plunger 185 is supported by a bracket plate 186 which also carries two microswitches 187, 188 provided with actuating levers 189, 190 engageable by the nut 183 as it travels outwards along the lead screw 182. Microswitch 187 controls the stop pawl actuator 173, 174 and microswitch 188 controls the fuel valve actuator 156, 157.

In addition, the side frame plates 168, 169 carry lamps 191, 192 which are exposed so as to be visible by a following aircraft. Lamp 191 is electrically connected to the microswitch 187 and lamp 192 is electrically connected to the microswitch 188. The connection of the fuel cock and stop pawl actuators 156, 157 and 173, 174, the lamps 191, 192 and the microswitches 187, 188 are shown in the circuit diagram, Figure 13.

Figure 13:
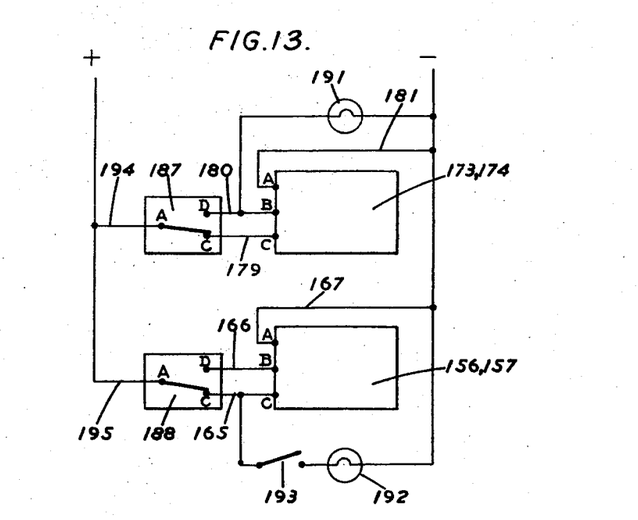
Figure 13 is a circuit diagram of the electrical connections of the winding gear of Figures 10 to 12 and the fuel and vent cock assembly of Figure 9.

It will be seen that the input terminals of both microswitches are connected to the positive main marked + and that the output terminals of the microswitch 187 are respectively connected to the input leads 179, 180 of the stop pawl actuator 173, 174. Similarly, the output terminals of microswitch 188 are respectively connected to the input leads 165, 166 of the fuel cock actuator 156, 157. The terminal of microswitch 187 carrying lead 180 is also connected through lamp 191 with the return main marked —, and the output terminal of switch 188 carrying lead 165 is connected through an override switch 193 (which is normally kept closed) and lamp 192 to the return main to which the return leads 167, 181 of the fuel cock and stop pawl actuators are also connected.

When the nut 183 is disengaged from both microswitch actuating levers 189, 190 microswitch 187 is closed on the output terminal carrying lead 179 and the microswitch 188 is closed on the output terminal carrying lead 165. In this condition the stop pawl actuator is energised to hold the stop pawls clear of the ratchet teeth of the reel and the fuel cock actuator is energised to open the fuel cock and close the vent cock. At the same time the circuit through lamp 191 is open and this lamp is extinguished while the circuit through lamp 192 is closed (provided the switch 193 is closed) and this lamp is illuminated. Lamp 191 is preferably provided with a red glass and lamp 192 with a green glass. The free end of the hose with the drogue thereon may when retracted be exposed to air currents which will initiate its paying out, or, alternatively, the paying out may be initiated manually or by any other means common in the art. As the hose is payed out by the reel the nut 183 moves outwards along the lead screw 182 and when the hose is nearly fully payed out the nut engages the actuating lever 190 and throws over the microswitch 188 to close it on the output terminal carrying lead 166, thereby reversing the fuel cock actuator to close the fuel cock and open the vent cock, at the same time opening the circuit of lamp 192 so as to extinguish the latter. When the hose is fully payed out the nut 183 engages the actuating lever 189 and throws over microswitch 187 to close it on the output terminal carrying lead 180 to reverse the stop pawl actuator and extend the pawls 171 into engagement with the ratchet teeth 172 of the reel. This stops the hose from running right out, and, by transferring the function of resisting the tension of the hose to the stop pawls, relieves the motor 142 (which, as previously explained, is kept running at reduced power) and the transmission 143–151 of the load imposed by the hose tension. At the same time the circuit through lamp 191 is closed to illuminate this lamp.

When the drag imposed on the hose by the drogue 33 is relieved by forward thrust imparted by the probe carried by the following aircraft, the slack in the hose is taken up by the torque transmitted to the reel 141 through the fluid coupling 146 by the motor 142. Fluid coupling 146 may be of conventional construction, such as is exemplified in the Blank et al. United States Patent 2,562,567, granted July 31, 1951. The nut 183 thereupon moves back along the lead screw 182 and first disengages the actuating lever 189 of microswitch 187, thereby reversing the microswitch connections and causing the stop pawl actuator to withdraw the stop pawls from the ratchet teeth and extinguish the lamp 191. When the end of the hose 32 carrying the drogue 33 has been moved forward relatively to the leading aircraft by the thrust of the probe carried by the following aircraft a short distance, e.g. about 4 ft., and this amount of slack in the hose has been taken up by the reel 141, the nut 183 has moved back far enough along the lead screw 182 to disengage the actuating lever 190 and reverse the connections of the microswitch 188 to open the fuel cock and illuminate lamp 192. In this condition fuel can be passed from one aircraft to the other. If the following aircraft falls back beyond the critical position at which the nut 183 engages the actuating lever 190 of the microswitch 188 the fuel valve will close and the lamp 192 will be extinguished. The extinction of lamp 192 warns the pilot of the following aircraft that he is losing station and must close in again and the closing of the fuel cock forestalls the possibility of the probe pulling out of the socket on the end of the trailing hose 32 while the fuel cock is still open. As already explained, the valve in the socket itself closes automatically when the probe pulls out of the socket so that in this event the fuel actually in the trailing hose 32 is not lost. This fuel can, of course, be recovered by reeling in the hose sufficiently to open the internal fuel cock 153 and pumping the fuel back into the tanks of the aircraft.

In the alternative form of apparatus illustrated in Figures 3 to 6, the pipe 37 may likewise be provided with a fuel cock and vent cock operated by an electromagnetic actuator as illustrated in Figure 15, the actuator being controlled by a microswitch 188 having an actuating lever 190 operated by a cam 46a formed on the banjo 46 as shown in Figure 6.

We claim:

1. In an aircraft flight refuelling apparatus wherein a hose is extended rearwardly in trailing relation from an aircraft by the drag of the atmosphere, a reel in said aircraft, means rotatably supporting said reel, said hose being wound on said reel and having a free end extending in said trailing relation from the aircraft whereby the drag of the atmosphere thereon will exert an unwinding torque on said reel, a motor, a fluid coupling driven by said motor and connected in driving relation to said reel for constantly exerting a winding torque on said reel of slightly less magnitude than said unwinding torque, to permit paying out of said hose at a controlled rate by the drag thereon, a fuel cock communicating with and controlling the passage of fuel through said hose, an electromagnetic actuator connected to and operative to open and close said cock, a switch in circuit with said actuator for controlling the operation thereof, and means actuated by said reel responsive to a predetermined number of unwinding revolutions thereof for operating said switch to close said fuel cock, said reel actuated means including an element operatively connected to said reel for movement proportional to the rotary movement of the reel, and into actuating engagement with said switch.

2. The combination defined in claim 1 wherein said means actuated by said reel for operating said switch comprises a lead screw connected to the reel for rotation therewith, a nut threaded on said lead screw, means engaging said nut to prevent rotation thereof while leaving said nut free for axial movement, said switch having an operating arm extending into the path of axial movement of said nut.

3. The combination of claim 1 including normally inoperative one-way braking mechanism associated with said reel and operative to oppose unwinding rotary movement of said reel and to permit substantially unimpeded winding rotary movement of the reel to retract said hose, and electric actuating means for said mechanism controlled by said reel actuated means responsive to a predetermined amount of unwinding rotary movement of the reel.

4. The combination of claim 3 wherein said one-way braking mechanism includes a rigid wheel connected to and rotatable with said reel, pawl supporting means movable towards and away from said wheel, a pawl carried by said supporting means for movement to and from operative engagement with the wheel, said electric actuating means being operatively connected to said supporting means.

5. In an aircraft flight refuelling apparatus wherein a hose extends rearwardly in trailing relation from the aircraft due to the drag of the atmosphere thereon, a reel mounted for rotation in the aircraft, said hose being wound on the reel, a motor and a fluid coupling mounted in said aircraft, said coupling being driven by said motor and operatively connected to said reel for exerting a constant retractive force on said hose in opposition to said drag but of less magnitude than said drag, a fuel cock communicating with and controlling the passage of fuel through said hose, an electric actuator connected to and controlling the position of said cock, a switch in circuit with said actuator, and means operated by and responsive to paying out of said hose to a predetermined point for actuating said switch to cause the actuator to close said cock, said reel actuated means including an element operatively connected to said reel for movement proportional to the rotary movement of the reel, said switch having an operating arm in the path of movement of said element.

6. The combination of claim 5 including one-way stop means cooperating with said hose and operative responsive to paying out of the hose beyond a predetermined point for arresting the paying out movement thereof, said stop means permitting substantially unimpeded retraction of the hose.

References Cited in the file of this patent

UNITED STATES PATENTS

| | | |
|---|---|---|
| 1,848,372 | Moran | Mar. 8, 1932 |
| 2,388,013 | Rasor | Oct. 30, 1945 |
| 2,396,453 | Windle | Mar. 12, 1946 |
| 2,427,979 | Sorensen | Sept. 23, 1947 |
| 2,582,609 | Steele | Jan. 15, 1952 |
| 2,596,455 | Williams et al. | May 13, 1952 |
| 2,634,926 | Worlidge | Apr. 14, 1953 |

FOREIGN PATENTS

| | | |
|---|---|---|
| 558,880 | Great Britain | Jan. 26, 1944 |